United States Patent [19]

Smoot

[11] 4,157,848
[45] Jun. 12, 1979

[54] DIVERTER VALVE

[75] Inventor: David K. Smoot, Mission Woods, Kans.

[73] Assignee: Smoot Co., Kansas City, Kans.

[21] Appl. No.: 864,919

[22] Filed: Dec. 27, 1977

[51] Int. Cl.² ............................................. B65G 53/56
[52] U.S. Cl. ................................... 406/182; 137/874
[58] Field of Search ................ 302/1, 28, 64; 243/31; 137/872, 874; 251/172

[56] References Cited

U.S. PATENT DOCUMENTS

| | | | |
|---|---|---|---|
| 721,743 | 3/1903 | Richmond | 302/28 |
| 2,140,128 | 12/1938 | Craggs | 302/28 |
| 2,586,144 | 2/1952 | Benoit | 302/28 |
| 2,825,604 | 3/1958 | Sebestyen | 302/28 |
| 2,895,768 | 7/1959 | Bray | 302/28 X |
| 3,121,553 | 2/1964 | Grove | 251/172 |
| 3,132,669 | 5/1964 | Feldsted | 137/874 X |
| 3,174,806 | 3/1965 | Barber et al. | 302/28 |
| 3,907,374 | 9/1975 | Steele | 302/28 |

*Primary Examiner*—Robert B. Reeves
*Assistant Examiner*—James L. Rowland
*Attorney, Agent, or Firm*—Fishburn, Gold & Litman

[57] ABSTRACT

A diverter valve for pneumatic conveying systems comprises a pair of plates which are interconnected for relative translation. Each of the plates has at least one port therein for conveying materials through the valve. A seal ring is slidably mounted in a mating groove in a first one of the plates, and has an inner face which selectively abuts and seals against the second plate about the port therein during a material conveying position. A source of pneumatic pressure is connected with the first plate and communicates with the groove, thereby exerting pressure on an outer face of the seal ring and resiliently urging the same toward the second plate, whereby an airtight seal is formed between the ports.

12 Claims, 3 Drawing Figures

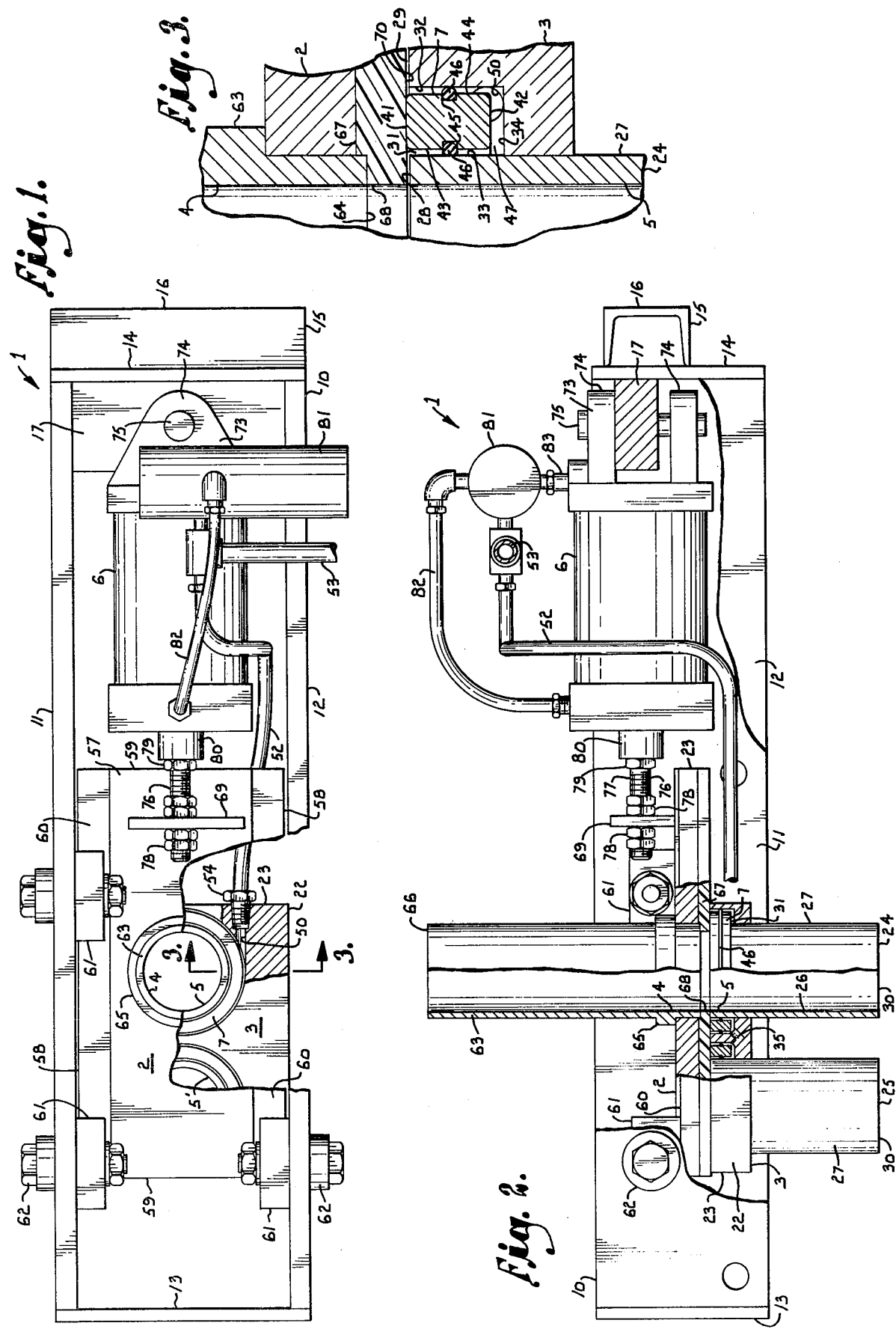

DIVERTER VALVE

BACKGROUND OF THE INVENTION

This invention relates to a diverter valve for pneumatic conveying systems, and in particular, to a slide diverter valve having an improved seal arrangement.

Bulk dry materials in a pelleted, granular and/or powdered form are frequently transported in a pneumatic conveying system from one point to another. In such conveying systems, the material to be conveyed is suspended in an airstream and the suspension is moved by either air pressure or a vacuum. The air thereby acts as a conveying medium for the material, and carries the same through a plurality of interconnected pipes or conduits which extend from the source of the material to the area into which the same is to be deposited.

Diverter valves are installed in the pneumatic lines to selectively control the flow of the material therethrough, and are adapted to intermittently direct the material flow from one line into two or more separate lines. If the valve does not form a secure seal between the various lines, the valve will leak and thereby permit a portion of the conveyed material to escape from the lines. This results not only in a loss of the material which is oftimes expensive, but also presents substantial housekeeping problems, particularly where the substance being conveyed is toxic, and/or particularly difficult to clean. Further, an improper valve seal results in a loss of line pressure or vacuum, thereby reducing the efficiency of the conveying system, and can also cause contamination of the material being conveyed.

The principal objects of the present invention are: to provide a diverter valve for pneumatic conveying systems having a secure seal for interconnecting various material conveying conduits; to provide such a diverter valve of the parallel sliding plate type having a seal ring mounted in a mating groove in one of the plates to prevent loss of conveyed material and/or line pressure, as well as alleviate contamination of the conveyed material and assist in neat housekeeping; to provide such a diverter valve wherein the seal ring includes inner and outer grooves in which a resilient seal ring is mounted and seals against associated groove surfaces; to provide such a diverter valve wherein the seal ring is urged resiliently into a sealing condition by air pressure; to provide such a diverter valve having an anti-friction plate positioned between the sliding plates for durable and reliable sealing action; to provide such a diverter valve wherein the plates are mutually translated by a pneumatic cylinder for convenient, safe and efficient operation; to provide such a diverter valve wherein the pneumatic cylinder is pivotally mounted in a valve frame for nonbinding translation of the mating valve plates; and to provide such a diverter valve which is economical to manufacture, efficient in use, capable of a long operating life, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

FIG. 1 is a top plan view of a diverter valve embodying the present invention with portions thereof broken away to show internal construction.

FIG. 2 is a side elevational view of the diverter valve, having portions thereof broken away.

FIG. 3 is an enlarged, fragmentary vertical cross-sectional view of the diverter valve, particularly showing a seal ring portion thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a diverter valve for pneumatic conveying systems embodying the present invention and comprising first and second plates 2 and 3 which are interconnected for relative translation therebetween. Each of the plates 2 and 3 includes at least one port 4 and 5 respectively, which have an aligned position for conveying materials therethrough, and a non-aligned position for diverting material flow. A motor 6 is attached to one of the plates 2 and 3 and translates the same with respect to the other plate for selectively positioning the ports 4 and 5 in the aligned and non-aligned positions. A seal ring 7 is slidably mounted in one of the plates for axial translation therein, and resilient means urges the seal ring toward the other plate to abuttingly form a seal about the ports 4 and 5.

A frame member 10 is provided for mounting the plates 2 and 3 and the motor 6 therein. In the illustrated example, the frame 10 has a substantially rectangular shape and comprises opposing side panels 11 and 12 and end members 13 and 14 each of which is mutually interconnected to form a substantially rigid structure. The illustrated side panels and end members have a flat, bar-like shape, and are constructed of a suitably rigid material such as aluminum, steel, or the like. A C-shaped channel 15 extends along and is attached to the end member 14, with a web portion 16 of the channel oriented outwardly of the valve. The C-shaped channel facilitates mounting the diverter valve 1 in the conveying system. A brace member 17 is positioned adjacent an interior surface of the end member 14, extends laterally between the frame side panels 11 and 12, and is fixedly attached thereto. The brace member 17 includes a transverse aperture therethrough and is adapted for mounting the motor 6 in the frame 10.

The plates 2 and 3 are mounted in the valve frame 10 for relative translation therebetween. In this example, the lower plate 3 is attached to the frame 10 and is stationary therewith, and the upper plate 2 is connected with the motor 6 and translates with respect to the lower plate 3. However, it is to be understood that the present invention contemplates any arrangement wherein the two plates are interconnected for relative movement therebetween. For purposes of description herein, the terms "upper, lower, right, left, rear, front" and the like shall relate to the diverter valve as oriented in FIG. 2, however, it is to be understood, that the diverter valve may assume virtually any alternative orientation without adversely effecting its operation.

In the illustrated structure, the lower plate 3 has opposing side edges 22 which extend between and are fixedly attached to the frame side panels 11 and 12, and includes a pair of free end edges 23. A pair of spaced apart apertures are disposed laterally through the bottom plate 3 and have a truncated, cylindrically shaped tubular member 24 and 25 sealingly positioned therein. Each of the tubular members 24 and 25 includes an interior surface 26 adapted for conveying materials therethrough, and an exterior surface 27 which abuts and seals with the associated plate aperture. The inner end 28 (FIG. 3) of each tube, is substantially coplanar with the inner surface 29 of the plate 3, is disposed adjacent to the upper plate 2 and defines bores 5 and 5′ which selectively align with bore 4 to convey materials therethrough. Each of the tubular members 24 and 25 includes a lower, free end 30 which is adapted for attaching a material conveying conduit (not shown) thereto, by means such as screw fittings, clamps, or the like. A groove 31 is positioned about the upper end of each of the tubular members 24 and 25, and is adapted to receive the seal ring 7 therein. In the illustrated structure, each groove 31 has an annular shape and is defined by outward and inward side walls 32 and 33, and a bottom surface 34. In this example, the radially inward groove side wall 33 is coextensive with the outer surface 27 of the associated tubular member at the upper end 28 of the same. The groove side surfaces 32 and 33 are substantially concentric, parallel and smooth, and are adapted for sealing with the seal ring 7. The grooves 31 are interconnected at adjacentmost portions thereof by a passageway 35, and pneumatic pressure is thereby communicated from the groove associated with tube 24, to the groove associated with tube 25. The illustrated passageway 35 is V-shaped, and may be formed by intersecting angle drilled apertures for reduced production costs.

A seal ring 7 is slidably mounted in each of the grooves 31, and is adapted to selectively seal between the bores 4 and 5, and 4 and 5′ respectively without interfering with the flow of material therethrough.

The illustrated seal ring 7 has an annular shape and includes end surfaces 41 and 42, and inner and outer circumferential surfaces 43 and 44 respectively. The seal ring circumferential surfaces 43 and 44 are positioned adjacent to and form an airtight seal with the groove side wall surfaces 33 and 32 respectively. In the illustrated structure, each of the circumferential surfaces 43 and 44 includes a groove or channel 45 disposed at a medial portion therein, and extends circumferentially about the entire surface. An "O" ring 46 constructed of a flexible, resilient material, such as synthetic rubber, or the like, is mounted in each of the channels 45, and includes an outward, free surface which abuts and forms a secure seal with the associated groove side wall. The thickness of the seal ring 7 as measured between the upper and lower end surfaces 41 and 42 is substantially smaller than the depth of the associated groove 31, as measured along either of the side walls 31 and 32 whereby the seal rings can slide axially within the associated groove. An airtight cavity 47 is formed in each groove 31 below the "O" rings 46 for purposes to be set forth hereinafter. The seal rings 7 are constructed of a fairly rigid material such as steel or the like, and the upper surface 41 thereof has a very flat and smooth finish which is adapted for abutting and sealing against the upper plate 2. The circumferential edges of the seal rings 7 are preferably slightly rounded to facilitate sealing engagement with the upper plate 2 and sliding movement therebetween.

Resilient means urges the seal rings 7 toward the upper plate 2, whereby the smooth seal ring faces 41 abuttingly engage the upper plate and form a seal therewith. In this example, a passageway 50 is provided in the lower plate 3 and extends from the end edge 23 thereof inwardly into and communicating with the airtight cavity portion 47 of the groove 31 adjacent the intersection of the bottom and side groove surfaces 34 and 32 respectively. The passageway 50 is connected with a source of pressurized fluid, such as air, through conduit members 52 and 53. In this example, fitting 54 detachably connects the conduit 52 to the lower plate 2.

The illustrated upper plate 2 is disposed upon and is supported by the lower plate 3. The upper plate 2 includes an upper surface 57, opposing side edges 58, and end edges 59. A slot or channel 60 extends through the upper surface 57 longitudinally along each side edge 58 and is adapted to receive the lower surface of a mating bearing block 61 therein. In this example, two bearing blocks 61 are mounted on each frame side panel 11 and 12 by associated fasteners 62, and are preferably vertically adjustable by means such as an eccentric or cam mechanism thereon. The bearing blocks 61 are constructed of a rigid material such as steel, bronze, or the like, and retain the upper plate 2 in abutting, sliding contact with the seal rings 7, and may be adjusted to vary the clearance between the upper and lower plates. A tubular member 63 is sealingly mounted in the port 4 and includes an inner end 64 thereof positioned adjacent to the inner end 28 of each of the remaining tubular members 24 and 25. The tubular member 63 includes a shoulder 65 which retains the tubular member 63 in a set position with the upper plate 2. The free end 66 of the tubular member 63 is adapted for attaching a flexible conduit member (not shown) thereto by means such as a fitting or a hose clamp. The tubular member 63 has a smooth inner surface 66 which is adapted for conveying materials therethrough and has a diameter substantially commensurate with the diameter of each remaining tubular member inner surface 26 to alleviate flow restriction through the valve. The illustrated upper plate 2 includes an anti-friction plate 67 attached to the lower surface thereof to facilitate sliding contact between the upper plate and the seal ring 7. The anti-friction plate 67 has a port 68 therethrough which is commensurate in size with the tubular member 63 whereby the same presents a smooth, obstruction-free, cylindrical passageway. The anti-friction plate is preferably constructed of a durable plastic material, such as a reinforced phenolic, the material marketed under the trademark Delrin, or the like, for smooth, lubricant free sliding contact with the seal rings. The illustrated anti-friction plate 67 has a shape co-extensive with the lower surface of the upper plate 2 and is securely fastened thereto by means such as adhesive, or the like. An upstanding arm or brace member 69 has a lower edge portion thereof rigidly fastened to the upper surface of the upper plate 2, and includes a transversely disposed aperture therethrough for connecting the motor 6 to the upper plate 2.

As best illustrated in FIG. 3, the bearing blocks 61 are preferably adjusted to interconnect the upper and lower slide plates 2 and 3 with a slight aperture or gap between the upper surface 28 of the lower plate 3 and the lower surface 70 of the upper plate 2 for smooth translation therebetween. When the valve 1 is in the sealed position, the end surface 41 of both of the seal rings 7 is urged tightly against the antifriction plate 67, thereby spreading the plates fully apart. In this position, the seal ring end surfaces 41 extend above the upper surface 28 of the lower plate, and the seal rings seal the gap or aperture between the plates.

The motor 6 translates the upper plate 2 with respect to the lower plate 3 for selectively positioning the conveying ports 4, 5 and 5' in an aligned position for conveying materials therethrough, and a non-aligning position for diverting material flow. In the illustrated structure, the motor 6 comprises a double acting pneumatic cylinder having a clevis or yoke portion 73 pivotally interconnecting the cylinder 6 with the frame 10. The yoke portion has forks 74 which are positioned to straddle the frame brace 17, and a pin 75 is positioned through the yoke and brace and pivotally interconnects the cylinder with the frame. The pivoted mounting of the cylinder 6 alleviates binding between the upper and lower plates during relative translation of the same. The cylinder includes a rod 76 having a threaded end 77 detachably connected with the upstanding brace member 69. In the illustrated structure, a double nut arrangement 78 is provided on each side of the upstanding brace 69 for securely attaching the cylinder to the upper plate, yet allowing means for adjusting the alignment of the tubular members 24, 25 and 66. A stop nut 79 is threadedly connected with the rod and abuts a cylinder shoulder member 80 for adjustably retaining the upper plate in a retracted position. Means such as an electrically operated solenoid valve 81 is connected with the air pressure inlet line 53, and distributes air through tubular members 82 and 83 to the selected side of the air cylinder.

In operation, the diverter valve 1 is initially mounted in the pneumatic conveying system (not shown) at a location wherein the user wishes to selectively divert the flow of incoming material from one line to another. The inlet line 66 includes a flexible portion to accomodate for the sliding movement of the upper plate 2 and is securely attached to the upstream tubular member 63. The downstream tubular members 24 and 25 are similarly attached to separate conduit lines. Air pressure is supplied to the inlet conduit 53 and is transmitted through tubular member 52 and passageways 50 and 35 into each of the cavities formed below the inner and outer O-rings. The air supply is preferably clean, dry and lubricated plant air, and is in the pressure range of 80–120 psig. For a pressurized pneumatic conveying system operating at pressures of up to 75 psig, the supply to the seal rings is preferably in the nature of 100 psig. The air pressure acts on the lower surfaces of the seal rings 7 and the outwardly protruding portions of the resilient seals 46, and resiliently urges the seal rings 7 toward the upper plate 2, whereby the upper end surfaces 41 of each of the seal rings abuts and seals against the lower surface of the anti-friction plate 67. In the orientation shown in FIG. 2, the right seal ring 7 forms an airtight seal between ports 4 and 5 for conveying materials through tubular member 24. The left seal ring 7 seals the port 5', tubular member 25, and attached conduit line (not shown) closed. The airstream with dry aggregate material therein is then commenced, and the suspension is conveyed through the tubular members 63 and 24 without leaking. To divert material flow into the left tubular member 25 from the right tubular member 24, the operator simply activates the solenoid control valve 81, which in turn, supplies air pressure to the outside cavity of the cylinder and forces the rod 76 into a fully extended position. The upper plate 2 and upstream tubular member 63 are thereby translated with respect to the lower plate 3 into a position wherein the upstream tubular member 66 is in substantial alignment with the left downstream tubular member 25 and ports 4 and 5' are in registry. As the upper plate 2 is translated, both of the seal rings 7 are continually urged into abutting and sealing relation with the lower surface of the anti-friction plate 67 to achieve a secure seal at all times between each of the ports. The diverter valve 1 is returned to its first described position by reversing the above sequence.

It is to be understood that while I have illustrated and described certain forms of my invention, it is not to be limited to the specific forms or arrangement of parts herein described and shown.

What is claimed and desired to secure by Letters Patent is:

1. A diverter valve for pneumatic conveying systems comprising:
    (a) first and second plates interconnected for relative movement therebetween, and having first and second ports respectively therethrough; said first and second ports having an aligned position for conveying materials therethrough, and a non-aligned position for diverting material flow;
    (b) means for moving one of said first and second plates with respect to the other for selectively positioning said ports in the aligned and non-aligned positions;
    (c) a seal ring positioned between said first and second ports, and slidably mounted in said second plate for axial translation therein; said seal ring having inner and outer marginal surfaces, and first and second end faces associated with said first and second plates respectively;
    (d) means resiliently urging said seal ring toward said first plate, whereby the first end face of said seal ring abuttingly engages the first plate and forms a seal about said first port;
    (e) means forming a seal between the outer marginal surface of said seal ring and the second plate; wherein
    (f) said second plate includes an inward surface having an annularly shaped groove therein positioned adjacent to and concentric with said second port, and receiving said seal ring therein; said groove being defined by a bottom, and radially inward and outward side walls;
    (g) means sealing the inner marginal surface of said ring and the inward side wall of said groove;
    (h) said seal ring inner and outer marginal surfaces each have a circumferential groove therein; and
    (i) inner and outer resilient seal rings mounted in the groove of said ring inner and outer surface respectively, each of said inner and outer resilient seal rings having a free edge sealingly engaging the inner and outer side wall respectively of the groove in the second plate.

2. In a diverter valve for pneumatic conveying systems, said diverter valve having first and second sliding plates with a port in each for conveying materials through the valve, the improvement comprising:
    (a) a seal ring slidably mounted in a mating groove in the second plate, and having a first end face thereof abuttingly sealing against the first plate about the port therein during a material conveying position;

(b) pneumatic pressure means connected with said second plate, communicating with said groove, and exerting pressure on a second end face of said seal ring and resiliently urging the same toward said first plate, whereby an airtight seal is formed between said ports; wherein (c) said seal ring includes an inner and an outer marginal surface each having a circumfetential groove therein; and including (d) inner and outer resilient seal rings mounted in the groove of said seal ring inner and outer surface; each of said inner and outer resilient seal rings having a free edge sealingly engaging an inner and an outer side wall respectively of the groove in said second plate.

3. A diverter valve as set forth in claim 2 including:
(a) a phenolic anti-friction plate connected with an inner surface of said first plate and slidingly abutting said seal ring first end face and sealing therewith.

4. A diverter valve for pneumatic conveying systems comprising:
(a) first and second plates interconnected for relative movement therebetween, and having first and second ports respectively therethrough; said first and second ports having an aligned position for conveying materials therethrough, and a non-aligned position for diverting material flow; said second plate including an inward surface having a circularly shaped groove therein positioned concentric with said second port;
(b) means for moving one of said first and second plates with respect to the other for selectively positioning said ports in the aligned and non-aligned positions;
(c) a rigid seal ring positioned between said first and second ports, and slidably mounted in the groove of said second plate for axial translation therein; said rigid seal ring having inner and outer marginal surfaces, and first and second end faces associated with said first and second plates respectively;
(d) a resilient seal ring mounted on the outer marginal surface of said rigid seal ring, and having a free edge sealingly engaging an outer surface defining said groove; and
(e) fluid pressure means applied to said rigid seal ring toward said first plate, whereby the first end face of said rigid seal ring abuttingly engages the first plate and forms a seal about said first port.

5. A diverter valve as set forth in claim 4 wherein:
(a) said first plate is positioned on an upstream side of said material flow.

6. A diverter valve as set forth in claim 4 including:
(a) an anti-friction plate attached to an interior surface of said first plate for movement therewith and having a port therethrough aligned with said first port; said anti-friction plate slidingly engaging said rigid seal ring and abuttingly sealing therewith.

7. A diverter valve as set forth in claim 6 wherein:
(a) said anti-friction plate is constructed of a phenolic resin material.

8. A diverter valve as set forth in claim 4 wherein:
(a) said plate moving means comprises a pneumatic cylinder.

9. A diverter valve as set forth in claim 4 wherein:
(a) said groove is annularly shaped, and further defined by an inner surface and a bottom;
(b) said resilient seal ring constitutes an outer resilient seal ring; and including
(c) an inner resilient seal ring mounted on the inner marginal surface of said rigid seal ring, and having a free edge sealingly engaging the inner surface of the groove.

10. A diverter valve as set forth in claim 9 wherein:
(a) said rigid seal ring inner and outer marginal surfaces each have a circumferential groove therein; and
(b) said inner and outer resilient seal rings are mounted in an associated one of said circumferential grooves.

11. In a diverter valve for pneumatic conveying systems, said diverter valve having first and second sliding plates with a port in each for conveying materials through the valve, the improvement comprising:
(a) a rigid seal ring slidably mounted in a mating groove in the second plate, and having a first end face thereof abuttingly sealing against the first plate about the port therein during a material conveying position;
(b) a resilient seal ring mounted on an outer marginal surface of said rigid seal ring, and having a free edge sealing engaging an outer side wall of said groove; and
(c) pneumatic pressure means connected with said second plate, communicating with said groove, and exerting pressure on a second end face of said rigid seal ring, and resiliently urging the same toward said first plate wherein an airtight seal is formed between said ports.

12. A diverter valve as set forth in claim 11 including:
(a) a phenolic anti-friction plate connected with an inner surface of said first plate and slidingly abutting said rigid seal ring inner face and sealing therewith.

* * * * *